US007721118B1

(12) United States Patent
Tamasi et al.

(10) Patent No.: US 7,721,118 B1
(45) Date of Patent: May 18, 2010

(54) OPTIMIZING POWER AND PERFORMANCE FOR MULTI-PROCESSOR GRAPHICS PROCESSING (75) Inventors: Anthony M. Tamasi, San Jose, CA (US); Philip B. Johnson, Campbell, CA (US); Franck R. Diard, Mountain View, CA (US); Brian M. Kelleher, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 554 days.

(21) Appl. No.: 10/950,609

(22) Filed: Sep. 27, 2004

(51) Int. Cl.
*G06F 1/00* (2006.01)
(52) U.S. Cl. .................. 713/300; 345/546; 345/502
(58) Field of Classification Search .............. None
See application file for complete search history.

(56) References Cited

U.S. PATENT DOCUMENTS

| | | | |
|---|---|---|---|
| 3,492,538 A | | 1/1970 | Fergusson |
| 4,647,123 A | | 3/1987 | Chin et al. |
| 5,448,655 A | | 9/1995 | Yamaguchi |
| 5,502,808 A | | 3/1996 | Goddard et al. |
| 5,522,027 A | | 5/1996 | Matsumoto et al. |
| 5,784,628 A | * | 7/1998 | Reneris ............... 713/300 |
| 5,794,016 A | | 8/1998 | Kelleher |
| 5,936,640 A | | 8/1999 | Horan et al. |
| 5,999,198 A | | 12/1999 | Horan et al. |
| 6,023,281 A | | 2/2000 | Grigor et al. |
| 6,111,757 A | | 8/2000 | Dell et al. |
| 6,191,800 B1 | | 2/2001 | Arenburg et al. |
| 6,195,734 B1 | | 2/2001 | Porterfield |
| 6,296,493 B1 | | 10/2001 | Michiya |
| 6,326,973 B1 | | 12/2001 | Behrbaum et al. |
| 6,329,996 B1 | | 12/2001 | Bowen et al. |
| 6,473,086 B1 | | 10/2002 | Morein et al. |
| 6,501,999 B1 | * | 12/2002 | Cai ............................ 700/82 |
| 6,535,939 B1 | * | 3/2003 | Arimilli et al. .............. 710/116 |

(Continued)

FOREIGN PATENT DOCUMENTS

EP        0428277        5/1991

(Continued)

OTHER PUBLICATIONS

"Alienware Announces Video Array and X2: An Exclusive Advancement in PC Graphics Technology", Alienware, May 12, 2004, <http://www.alienware.com/press_release_pages/press_release_template.aspx?FileName=press051204.esp>.

(Continued)

*Primary Examiner*—Thomas Lee
*Assistant Examiner*—Mohammed H Rehman
(74) *Attorney, Agent, or Firm*—Patterson & Sheridan, LLP (57) ABSTRACT

A system and method for optimizing power usage and performance during data processing. A multi-processor graphics processing system includes a low power graphics processor and a high performance graphics processor. When a low power condition exists only the low power graphics processor is used to process graphics data and the high performance graphics processor is turned off. When turned off, the high performance graphics processor does not consume either static or dynamic power. When the low power condition does not exist, the high performance graphics processor is turned on and the low power graphics processor and the high performance graphics processor are used to process the graphics data.

27 Claims, 6 Drawing Sheets

U.S. PATENT DOCUMENTS

| | | | |
|---|---|---|---|
| 6,631,474 B1 * | 10/2003 | Cai et al. | 713/300 |
| 6,633,296 B1 | 10/2003 | Laksono et al. | |
| 6,683,614 B2 | 1/2004 | Walls et al. | |
| 6,711,638 B1 | 3/2004 | Wu | |
| 6,750,870 B2 | 6/2004 | Olarig | |
| 6,760,031 B1 | 7/2004 | Langendorf et al. | |
| 6,882,346 B1 | 4/2005 | Lefebvre et al. | |
| 6,902,419 B2 | 6/2005 | Conway et al. | |
| 6,919,896 B2 * | 7/2005 | Sasaki et al. | 345/505 |
| 7,030,837 B1 * | 4/2006 | Vong et al. | 345/1.3 |
| 7,176,847 B2 * | 2/2007 | Loh | 345/2.2 |
| 7,184,003 B2 * | 2/2007 | Cupps et al. | 345/30 |
| 2002/0047851 A1 | 4/2002 | Hirase et al. | |
| 2002/0105523 A1 | 8/2002 | Behrbaum et al. | |
| 2002/0118201 A1 | 8/2002 | Mukherjee et al. | |
| 2003/0128216 A1 | 7/2003 | Walls et al. | |
| 2003/0137483 A1 | 7/2003 | Callway | |
| 2004/0072460 A1 | 4/2004 | Conway et al. | |
| 2004/0104913 A1 | 6/2004 | Walls et al. | |
| 2005/0017980 A1 | 1/2005 | Chang et al. | |
| 2005/0088445 A1 | 4/2005 | Gonzalez et al. | |
| 2005/0134588 A1 | 6/2005 | Aila et al. | |
| 2005/0160212 A1 | 7/2005 | Caruk | |
| 2005/0278559 A1 * | 12/2005 | Sutardja et al. | 713/320 |

FOREIGN PATENT DOCUMENTS

| | | |
|---|---|---|
| EP | 0571969 A2 | 12/1993 |
| FR | 2834097 A1 | 6/2003 |
| FR | 2839563 A1 | 11/2003 |
| JP | 5324583 A | 12/1993 |
| TW | 328392 | 3/1998 |
| TW | 570243 | 1/2004 |
| WO | WO 03/083636 A1 | 10/2003 |

OTHER PUBLICATIONS

"Alienware Promises Fastest Graphics Solution", Alienware, Jun. 28, 2004. <http://www.alienware.com/press_release_pages/press_release_template.aspx?FlleName=press062804.asp>.

"Frequently Asked Questions", Alienware, Oct. 22, 2004, <http://www.alienware.com/alx_pages/main_content.aspx>.

Whitman, Scott, "Dynamic Load Balancing for Parallel Polygon Rendering," IEEE Computer Graphics and Applications, IEEE Inc., New York, vol. 14, No. 4, Jul. 1, 1994.

Henry Fuchs, Distributing a visible surface algorithm over multiple processors, Proceedings of the 1977 annual conference, p. 449-451. Jan. 1977.

Edward Brown, Andy Thorne, "FireWire Audio Application utilizing high quality 96kHz 24bit I/O", Copyright Oxford Semiconductor 2004 © External—Free Release, Jul. 2004.

Wasson, "NVIDIA's SLI resurrects DPU teaming Kickin' it old school-with 32 pipes", www.techreport.com, Jun. 28, 2004. pp. 1-3, http://techreport.com/etc/2004q2/nvdia-sli/.

Weinand, "NVIDIA lance le SLI: une technologie multi-GDU", www.erenumerigue.fr, Jun. 29, 2004. pp. 1-7 http://www.erenumerique.fr/nvidia_lance_le_sli_une_technologie_multi_gpu-art-655-7.html.

Marc Prieur, "NVIDIA GeForce 6600 GT—HardWare.fr," Sep. 7, 2004, retrieved from http://www.hardware.fr/art/Imprimer/514. pp. 1-23.

English translation of: Marc Prieur, "NVIDIA GeForce 6600 GT—HardWare.fr," Sep. 7, 2004, retrieved from http://www.hardware.fd/art/imprimer/514. pp.1-24.

Scott Wasson, "NVIDIA's SLI Resurrects GPU Teaming: Kickin' It Old School—With 32 Pipes", Jun. 28, 2004, retrieved from http://techreport.com/articles.x/6931. 5 pgs.

PCT Search Report Oct. 12, 2007.

Weinand, Lars. "NVIDIA lance le SLI: une technologie multi-GPU." Jun. 29, 2004, retrieved on Apr. 16, 2008 from: http://www.erenumerique.fr/nvidia_lance_le_sli_une_technologie_multi_gpu-art-655-1.html. pp. 1-12.

English Translation of: Weinand, Lars. "NVIDIA lance le SLI: une technologie multi-GPU." Jun. 29, 2004, retrieved on Apr. 16, 2008 from: http://www.erenumerique.fr/nvidia_lance_le_sli_une_technologie_multi_gpu-art-655-1.html. pp. 1- 12.

Translated Search Report for ROC (Taiwan) Patent Application No. 094140479, provided as concise explanation of relevance of TW 570243 and TW 328392, date of completion Feb. 15, 2009.

Office Action. U.S. Appl. No. 10/991,169. Dated Apr. 14, 2009.

Office Action. U.S. Appl. No. 11/012,394. Dated Apr. 28, 2009.

Final Office Action, U.S. Appl. No. 11/012,394 dtd. Nov. 6, 2009.

Angelly, Clay. "NVIDIA GeForce 6600 Series Preview," nvnews, published on Aug. 12, 2004 (available at URL:http://www.nvnews.net/previews/geforce_6600_series/).

Gotoh, Hirosige, "Weekly Overseas News: NVIDIA Dual-GPU Solutions," PCWatch home page, published on Jun. 29, 2004 (available at URL: http://pc.watch.impress.co.jp/docs/2004/0629/kaigai099.htm).

Gotoh, Hirosige, "Weekly Overseas News: Questions Many of NVIDIA's SLI," PC Watch home page, published on Aug. 30, 2004 (available at URL: http://pc.watch.impress.co.jp/docs/2004/0830/kaigai113.htm).

English translation of: Gotoh, Hirosige, "Weekly Overseas News: NVIDIA Dual-GPU Solutions," PCWatch home page, published on Jun. 29, 2004 (available at URL:http://pc.watch.impress.co.jp/docs/2004/0629/kaigai099.htm).

English translation of: Gotoh, Hirosige, "Weekly Overseas News: Questions Many of NVIDIA's SLI," PC Watch home page, published on Aug. 30, 2004 (available at URL:http://pc.watch.impress.co.jp/docs/2004/0830/kaigai113.htm).

Excepts from letter received from foreign associate re. JP Patent App. No. 2007-543190, dated Feb. 1, 2010, provided as explanation of relevance of foreign language references.

* cited by examiner

PRIOR ART

OPTIMIZING POWER AND PERFORMANCE FOR MULTI-PROCESSOR GRAPHICS PROCESSING

FIELD OF THE INVENTION

One or more aspects of the invention generally relate to graphics processing, and more particularly to optimizing power usage and performance in a multi-processor graphics processing system.

BACKGROUND

Figure 1:
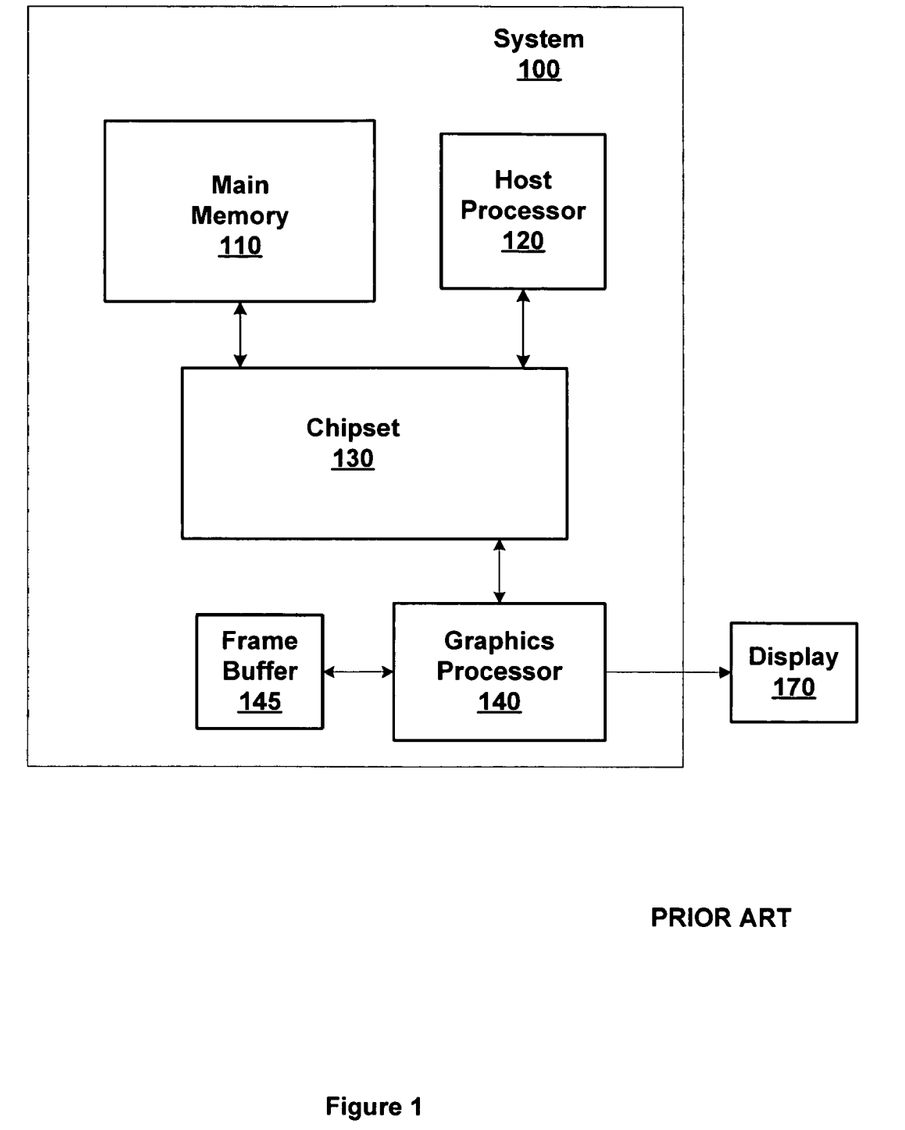
FIG. 1 is a block diagram of an exemplary embodiment of a prior art graphics processing system.

Conventional low power systems including a graphics processor, such as system 100 shown in FIG. 1, utilize a low power graphics processor 140 which reduces power usage at least in part by reducing graphics data processing performance to compared with other graphics processors. System 100 includes a host processor 120, a main memory 110, and a chipset 130 which is directly coupled to graphics processor 140. Graphics processor 140 receives instructions and data from chipset 130. Graphics processor 140 processes the data, storing image data in frame buffer 145 for output to a display 170.

High performance graphics processors offer greater graphics processing throughput which contributes to increased power usage compared with a low power graphics processor, such as graphics processor 140. The increased graphics processing throughput may be achieved by operating at a higher clock rate, including two or more graphics processing pipelines, and using wider and/or faster internal and external interfaces. The higher performance graphics processor is implemented in a larger die size than graphics processor 140 in order to include more transistors. Even when a high performance graphics processor is not processing graphics data it contributes to overall system power consumption due to the static power resulting from transistor leakage. Therefore the static power of a high performance graphics processor is greater than the static power of a low power graphics processor. Consequently, high performance graphics processors are not used in conventional portable systems which are battery powered.

Accordingly, it is desirable to minimize overall power consumption while improving graphics processing performance.

SUMMARY

The current invention involves new systems and methods for optimizing power usage and performance during graphics data processing. A multi-processor graphics processing system includes a low power graphics processor and a high performance graphics processor. When a low power condition exists only the low power graphics processor is used to process graphics data and the high performance graphics processor is turned off. When turned off, the high performance graphics processor does not consume either static or dynamic power. When the low power condition does not exist, the high performance graphics processor is turned on and the low power graphics processor and the high performance graphics processor are used to process the graphics data.

Various embodiments of the invention include a system for processing data. The system includes a first processing unit, a second processing unit, and a switch coupling the first processing unit to the second processing unit. The first processing unit is configured to process data at a first performance level and to consume a first level of power. The second processing unit is configured to process data at a second performance level and to consume a second level of power, wherein the second level of power is greater than the first level of power.

Various embodiments of a method of the invention for processing graphics data in a multi-processor graphics processing system, including determining whether a low power condition exists, processing the graphics data to produce processed graphics data using a low power graphics processor, if the low power condition exists, and processing the graphics data to produce the processed graphics data using the low power graphics processor and a high performance graphics processor, if the low power condition does not exist.

Various embodiments of a method of the invention for optimizing power usage and performance of a multi-processor data processing system, including determining whether a low power condition exists, disabling a high performance processor within the multi-processor data processing system, if the low power condition exists, and enabling the high performance processor within the multi-processor graphics data system, if the low power condition does not exist.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

When multiple processing units are included within a portable system, such as a laptop computer, palm-sized computer, tablet computer, game console, cellular telephone, hand-held device, or the like, one or more of the multiple graphics processing units may be enabled or disabled as needed to provide deliver a particular data processing performance or to adapt to a particular power environment. Therefore, the data processing performance and power consumption may be optimized to deliver the highest possible performance for the lowest possible power consumption.

Figure 2A:
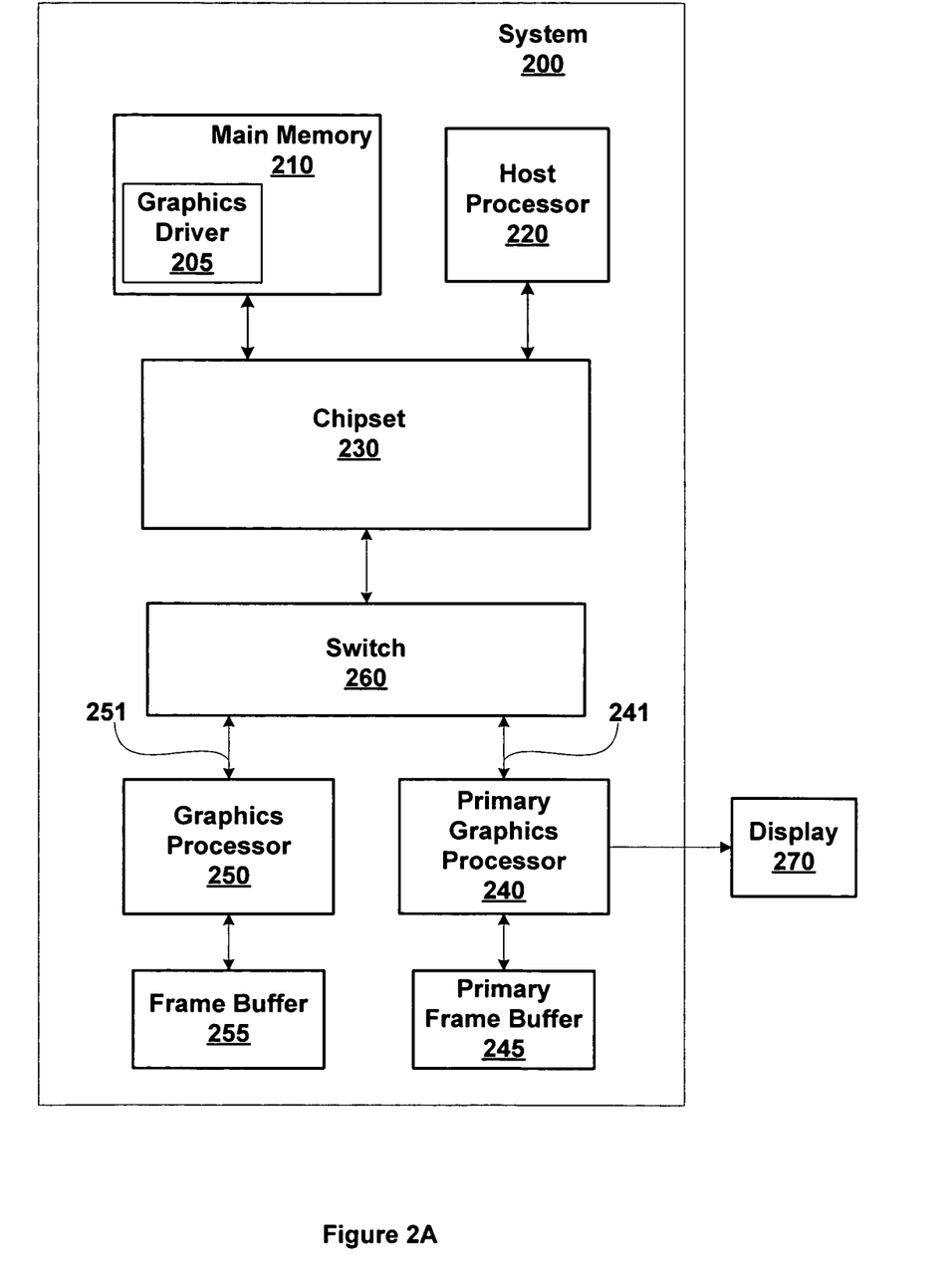
FIGS. 2A and 2B are exemplary embodiments of multi-processor graphics processing systems in accordance with one or more aspects of the present invention.

FIG. 2A is an exemplary embodiment of a multi-processor graphics processing system 200 in accordance with one or more aspects of the present invention. System 200 may be a desktop computer, server, laptop computer, palm-sized computer, tablet computer, game console, cellular telephone, hand-held device, computer based simulator, or the like. System 200 includes a host processor 220, a main memory 210, and a chipset 230 that is directly coupled to a switch 260. A graphics driver 205, stored within main memory 210, configures a graphics processor 250 and a primary graphics processor 240. Graphics driver 205 communicates between applications executed by host processor 220 and graphics adapters, graphics processor 250 and primary graphics processor 240. In some embodiments of the present invention, graphics driver 205 includes a device driver for graphics processor 250 and a device driver for primary graphics processor 240.

In some embodiments of system 200, chipset 230 may include a system memory bridge and an input/output (I/O) bridge that may include several interfaces such as, Advanced Technology Attachment (ATA) bus, Universal Serial Bus (USB), Peripheral component interface (PCI), or the like. Switch 260 provides an interface between chipset 230 and each of graphics processor 250 and primary graphics processor 240 via a connection 251 and a connection 241, respectively. In some embodiments of switch 260, switch 260 provides an indirect interface between graphics processor 250 and primary graphics processor 240 through the combination of connections 251 and 241. Switch 260 may also include interfaces to other devices.

In some embodiments the present invention, switch 260 transfers over connections 241 and 251 are performed using an industry standard protocol such as PCI-Express™ and switch 260, graphics processor 250, and primary graphics processor 240, each include an interface unit corresponding to the industry standard protocol. Primary graphics processor 240 outputs image data to a display 270. Display 270 may include one or more display devices, such as a cathode ray tube (CRT), flat panel display, or the like. In addition to display 270, primary graphics processor 240 is also coupled to a primary frame buffer 245 which may be used to store graphics data, image data, and program instructions. Graphics processor 250 is coupled to a frame buffer 255 which may also be used to store graphics data, image data, and program instructions.

Primary graphics processor 240 is a low power device, particularly well-suited for portable devices which may rely on battery power. Graphics processor 250 is a high performance graphics device which consumes more power than primary graphics processor 240 and offers enhanced graphics performance including image quality features and/or higher graphics processing throughput, e.g., frame rate, fill rate, or the like. Although system 200 as shown is a multi-processor graphics processing system, alternate embodiments of system 200 may process other types of data, such as audio data, multi-media data, or the like. In those alternate embodiments graphics processor 250 is replaced with a high performance data processing device and primary graphics processor 240 is a low power data processing device. Likewise, graphics driver 205 is replaced with one or more corresponding device drivers.

Figure 5A:
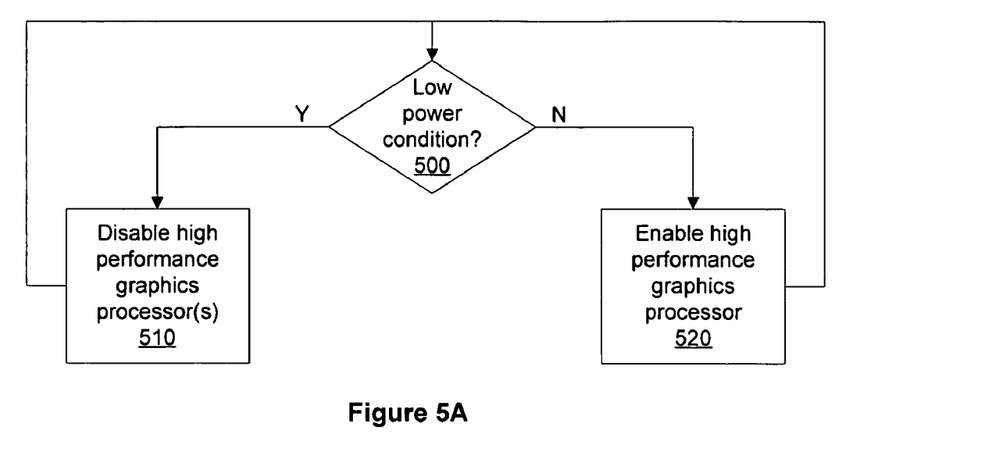
FIG. 5A is an exemplary embodiment of a method of optimizing power and performance for graphics processing in accordance with one or more aspects of the present invention.
Figure 5B:
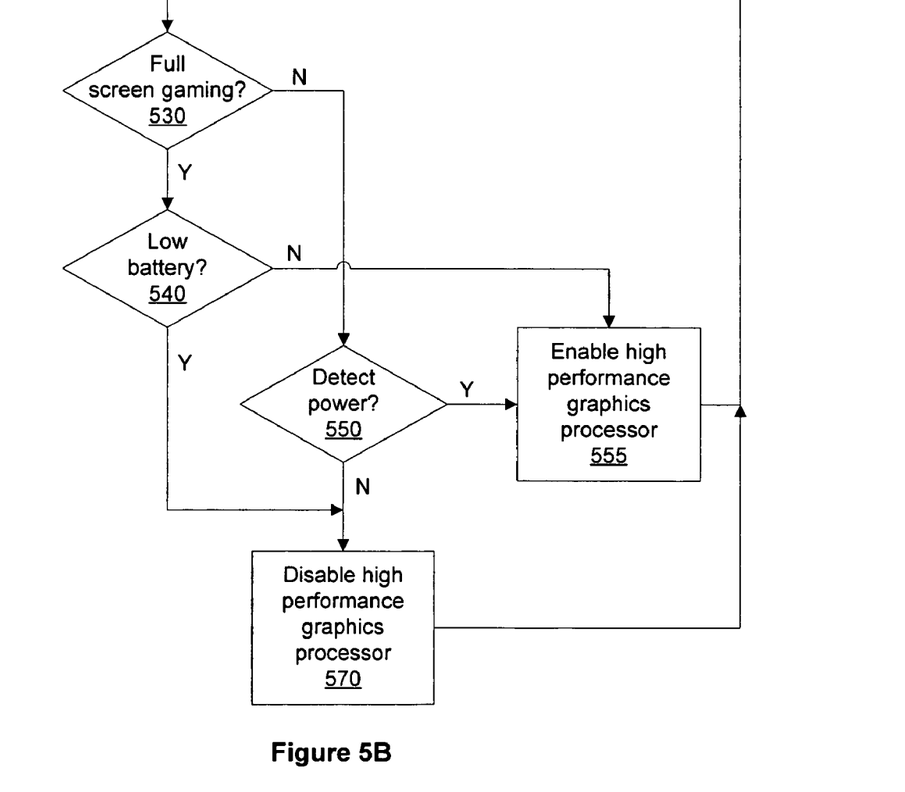
FIG. 5B is another exemplary embodiment of a method of optimizing power and performance for graphics processing in accordance with one or more aspects of the present invention.

In some embodiments of system 200 graphics driver 205 enables or disables graphics processor 250 responsive to a change in a low power condition, as described in conjunction with FIGS. 5A and 5B. For example, when graphics driver 205 determines a low power condition exists, graphics processor 250 is disabled. Conversely, when graphics driver 205 determines a low power condition does not exist, graphics processor 250 is enabled. When graphics processor 250 is disabled, it does not receive power, therefore both dynamic and static power consumption are reduced. Furthermore, frame buffer 255 does not receive power when graphics processor 250 is disabled, so power consumption is further reduced. In other embodiments of system 200, additional graphics processors 250 are coupled to switch 260. The additional graphics processors 250 may also be enabled and disabled based on the low power condition.

Graphics driver 205 may load balance graphics processing between graphics processor 250 and primary graphics processor 240. For example, graphics processor 250 may process a larger portion of an image than primary graphics processor 240. In some embodiments of the present invention, graphics processor 250 may process the entire image and primary graphics processor may receive the image data from graphics processor 250 via switch 260. In other embodiments of the present invention, host processor 220 controls the transfer of the image data from graphics processor 250 to primary graphics processor 240. Therefore, the image data must pass through interface 251, switch 260, chipset 230, main memory 210, and back through chipset 230, switch 260, and interface 241 to reach primary graphics processor 240.

Figure 2B:
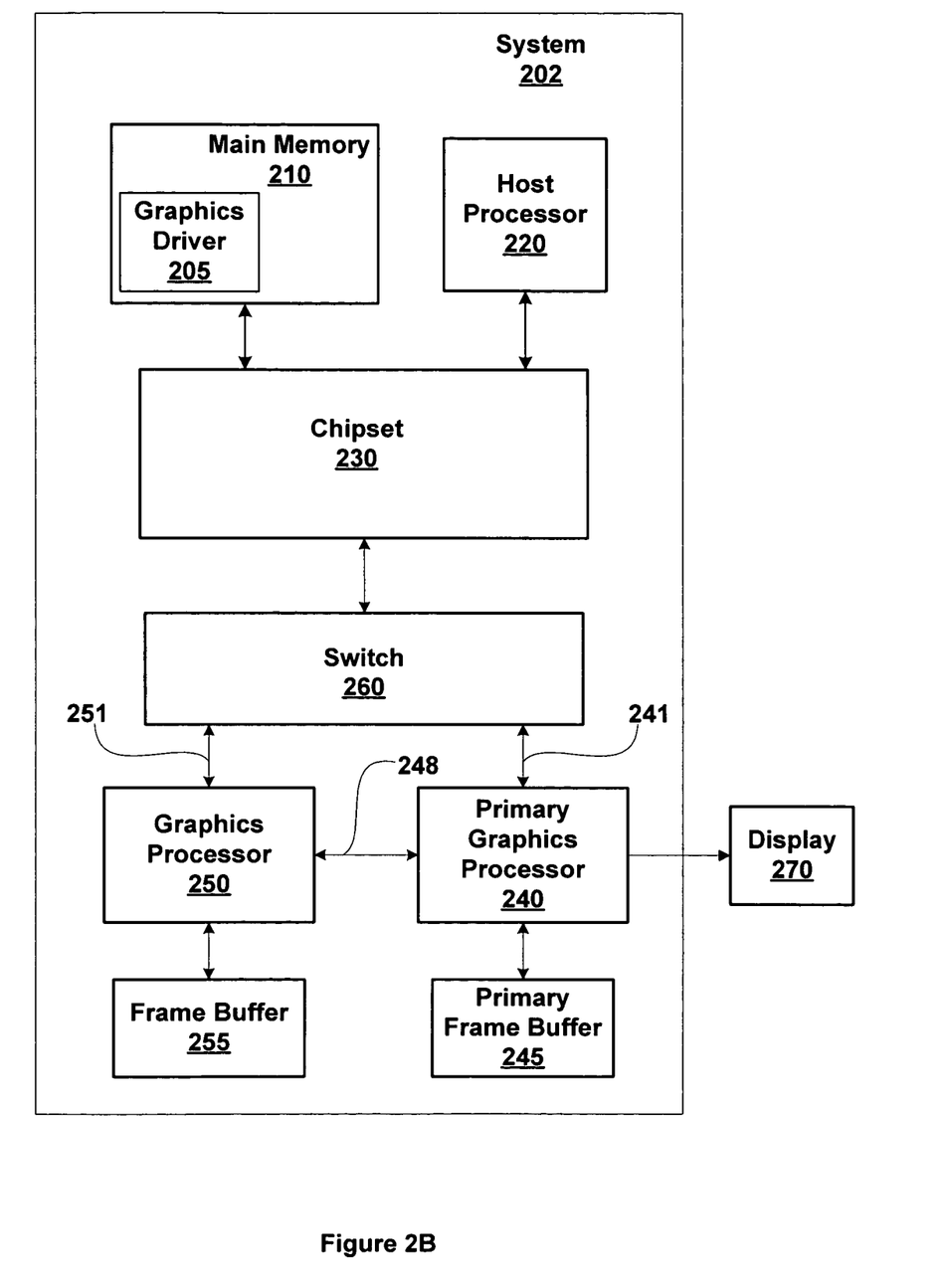

FIG. 2B is another exemplary embodiment of a multi-processor graphics processing system, system 202, in accordance with one or more aspects of the present invention. System 202 includes the elements shown in system 200 of FIG. 2A with a dedicated interface, graphics interface 248 directly coupling primary graphics processor 240 to graphics processor 250. Synchronization signals and graphics data, such as image data may be transferred between graphics processor 250 and primary graphics processor 240 using graphics interface 248.

When graphics interface 248 is used to transfer graphics data, the amount of bandwidth needed to transfer graphics data over interfaces 241 and 251 is reduced. Therefore, the bus width and/or speed of interfaces 241 and 251 may be decreased, reducing the power consumed by interfaces 241 and 251. Furthermore, transferring image data from graphics processor 250 to primary graphics processor 240 does not require passing the image data through switch 260, chipset 230, or main memory 210. Therefore, dynamic power consumed by switch 260, chipset 230, and main memory 210 may be reduced. However, the power savings are offset by the power consumption of graphics interface 248. In some embodiments of the present invention, graphics interface 248 is 4 or 8 bits wide. In those embodiments, the power consumed by graphics interface 248 is less than the power consumed by comparatively wider interfaces between main memory 210, chipset 230, and switch 260.

In some embodiments of the present invention, interface 251 and interface 241 are based on the PCI-Express™ standard and may each support 16 lanes. In other embodiments of the present invention, interface 251 and interface 241 may support less than or more than 16 lanes. Graphics driver 205 measures the amount of bandwidth used during graphics processing for interface 251 and interface 241 and dynamically resizes the number of lanes allocated for interface 251 and the number of lanes allocated for interface 241. The power consumed by interfaces 241 and 251 is reduced as the number of lanes is reduced for each of interfaces 241 and 251, thereby optimizing the power consumption dependent on the bandwidth needed for the graphics processing performed by graphics processor 250 and/or primary graphics processor 240.

For example, when graphics processor 250 is disabled 16 lanes may be allocated for primary graphics processor 240 to satisfy a particular graphics processing performance level. The graphics processing performance level may be quantified as a specific frame rate, primitives rendered per second, texture rendering speed, image resolution, or the like. The graphics processing performance level may also include an image quality component, such as trilinear filtered texture mapping, antialiasing, multiple light sources, or the like. The graphics processing performance level may be fixed, specified by the application, or specified by a user. When graphics processor 250 is enabled, the number of lanes allocated for primary graphics processor 240 may be resized to fewer than 16 lanes and 16 lanes may be allocated for graphics processor 250.

In some embodiments of the present invention data, such as texture maps, written to frame buffer 255 and primary frame buffer 245 by host processor 220 are broadcast to graphics processor 250 and primary graphics processor 240, respectively, rather than being separately written to frame buffer 255 and primary frame buffer 245. When the broadcast feature is used, the bandwidth consumed to transfer data to frame buffer 255 and primary frame buffer 245 is effectively halved. Therefore, the dynamic power consumption is reduced when the bandwidth feature is used. Reducing the bandwidth between host processor and each of graphics processor 250 and primary graphics processor 240 may also improve system performance as well as graphics processing performance. Furthermore, when additional graphics processors, also connected to primary graphics processor 240 via graphics interface 248, are included in system 200 the broadcast feature further reduces the dynamic power consumption compared with separately transferring data to each of the additional graphics processors.

Figure 3:
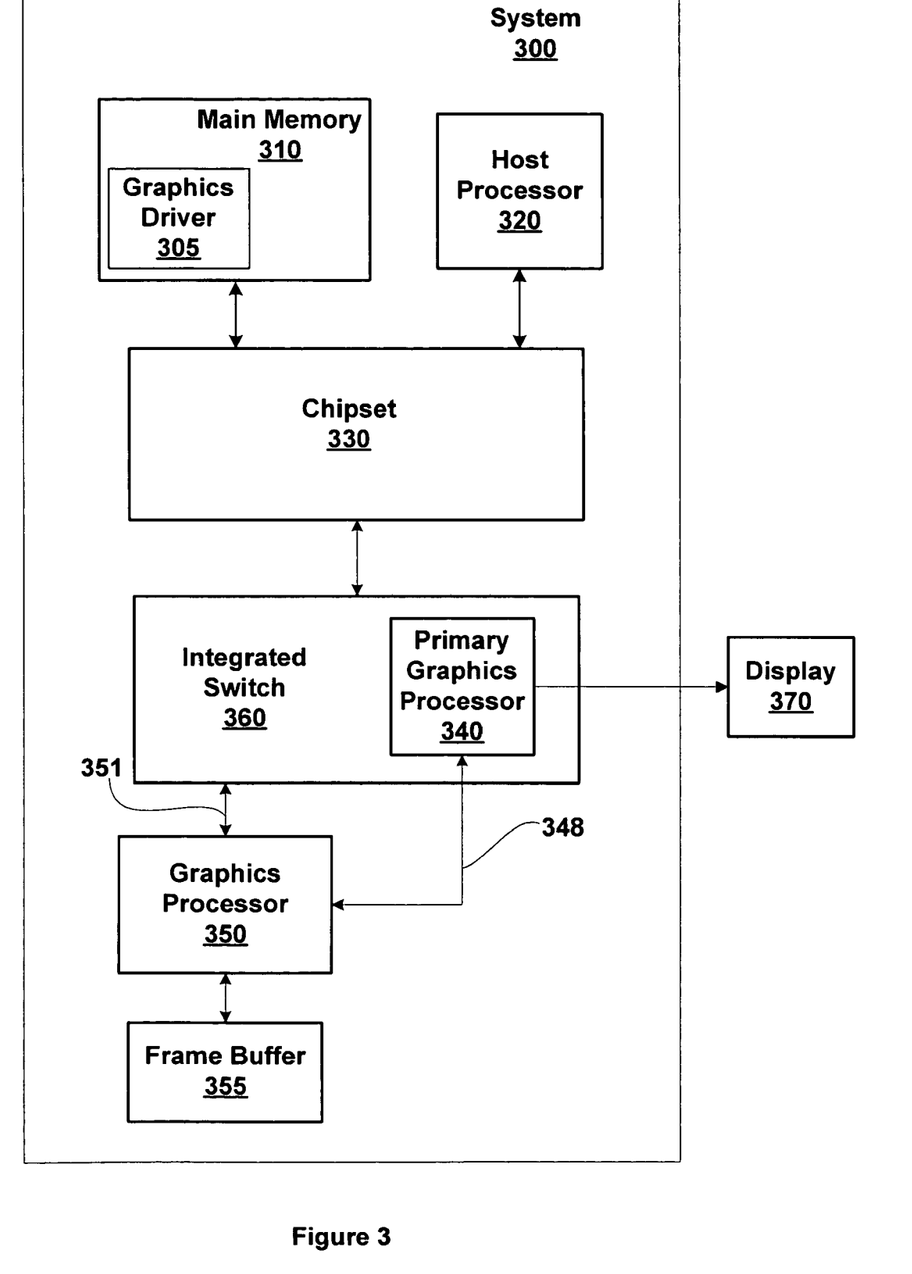
FIG. 3 is another exemplary embodiment of a multi-processor graphics processing system in accordance with one or more aspects of the present invention.

FIG. 3 is another exemplary embodiment of a multi-processor graphics processing system, system 300, in accordance with one or more aspects of the present invention. System 300 includes several of the elements shown in systems 200 and 202. Specifically, host processor 320 corresponds to host processor 220, main memory 310 corresponds to main memory 210, graphics driver 305 corresponds to graphics driver 205, display 370 corresponds to display 270, graphics processor 350 corresponds to graphics processor 250, and frame buffer 355 corresponds to frame buffer 255. Primary graphics processor 340 performs similar functions as primary graphics processor 240, including operating at a low power level compared with graphics processor 350. However, primary graphics processor 340 is included within integrated switch 360 and interface 351 corresponds to interface 251.

Integrating primary graphics processor 340 within integrated switch 360 may result in a reduction in power consumption due to the elimination of an external interface including the I/O drivers between integrated switch 360 and primary graphics processor 340. In some embodiments of the present invention, graphics interface 348 directly coupling graphics processor 350 to primary graphics processor 340 may be omitted and graphics data may be transferred between graphics processor 350 and primary graphics processor 340 via interface 351 and connections within integrated switch 360. In those embodiments power consumption by graphics interface 348 is eliminated.

System 300 may also use the broadcast feature and dynamic lane resizing, as previously described, to further reduce power consumption. Graphics driver 305 enables or disables graphics processor 350 responsive to a change in a low power condition, as described in conjunction with FIGS. 5A and 5B. When graphics processor 350 is enabled, graphics driver 305 may also perform load balancing, as previously described in conjunction with FIG. 2A.

Figure 4:
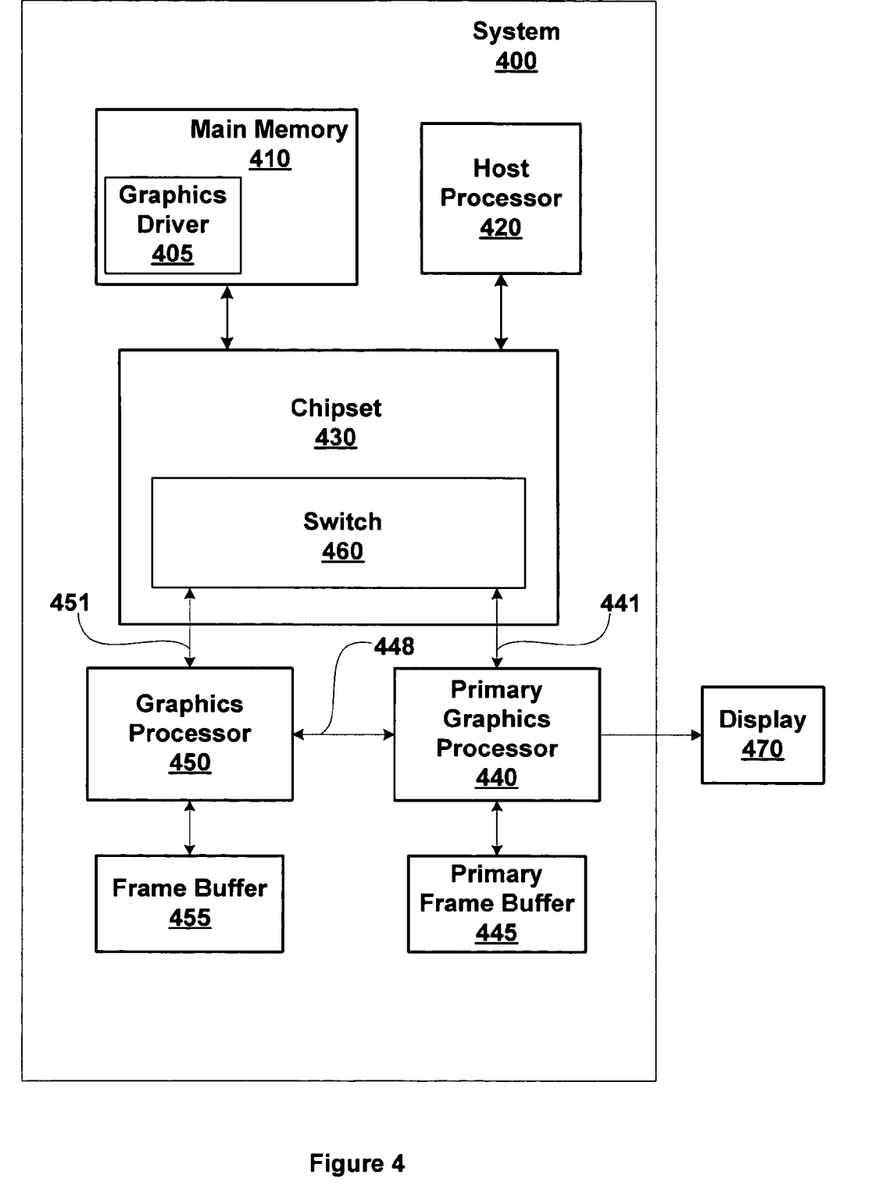
FIG. 4 is another exemplary embodiment of a multi-processor graphics processing system in accordance with one or more aspects of the present invention.

FIG. 4 is another exemplary embodiment of a multi-processor graphics processing system, system 400, in accordance with one or more aspects of the present invention. Like system 300, system 400 includes several of the elements shown in systems 200 and 202. Specifically, host processor 420, main memory 410, graphics driver 405, display 470, primary graphics processor 440, primary frame buffer 445, graphics processor 450, and frame buffer 455 correspond to host processor 220, main memory 210, graphics driver 205, display 270, primary graphics processor 240, primary frame buffer 245, graphics processor 250, frame buffer 255, respectively. However, switch 460, which performs the functions of switch 260, is included within chipset 430.

Interfaces 451 and 441 correspond to interfaces 251 and 241, respectively. In some embodiments of the present invention, graphics interface 448 which directly couples graphics processor 450 to primary graphics processor 440 may be omitted and graphics data may be transferred between graphics processor 450 and primary graphics processor 440 via interface 451, interface 441, and switch 460. In those embodiments there would be no power consumption due to graphics interface 448.

System 400 may also use the broadcast feature and dynamic lane resizing to further reduce power consumption. Graphics driver 405 enables or disables graphics processor 450 responsive to a change in a low power condition, as described in conjunction with FIGS. 5A and 5B. When graphics processor 450 is enabled, graphics driver 405 may also perform load balancing, as previously described in conjunction with FIG. 2A.

In alternate embodiments of the present invention, the graphics processors may be replaced with other types of processors, such as audio processors, multi-media processors, or the like. Likewise, the graphics drivers may be replaced with other drivers corresponding to the other types of processors. Just as the graphics processing performance and power consumption for a computing system may be optimized to deliver the highest possible graphics performance for the lowest possible power consumption, processing performance for other types of data and power consumption for a computing system may be optimized.

FIG. 5A is an exemplary embodiment of a method of optimizing power and performance for data processing in accordance with one or more aspects of the present invention. In step 500 a graphics driver, such as graphics driver 205, 305, or 405, determines if a low power condition exists. If, in step 500 the graphics driver determines that a low power condition does not exist, then in step 520 the graphics driver enables one or more high performance graphics processors within a computing system, such as system 200, 202, 300, or 400. If, in step 500 the graphics driver determines that a low power condition does exist, then in step 510 the graphics driver disables the one or more high performance graphics processors within the computing system.

After completing step 510 or step 520, the graphics driver returns to step 500. In an alternate embodiment of the present invention that includes multiple high performance graphics processors such as graphics processor 250, 350, 365, or 450, the graphics driver disables or enables a number of the graphics processors dependent on low power threshold values. The low power threshold values may be fixed or programmable and each one controls enabling or disabling of a specific number of the multiple high performance graphics processors.

FIG. 5B is another exemplary embodiment of a method of optimizing power and performance for graphics processing in accordance with one or more aspects of the present invention.

In step 530 a graphics driver, such as graphics driver 205, 305, or 405, determines if a full screen gaming mode is being used. In other embodiments of the present invention, the graphics driver determines if a high performance or high image quality mode is enabled in step 530. If, in step 530 the graphics driver determines that the full screen gaming mode is being used, then it proceeds to step 540. If, in step 530 the graphics driver determines that the full screen gaming mode is not being used, then in step 550 the graphics driver determines if a supplemental power supply is provided, for example battery powered computing systems, e.g., a laptop or portable device, is plugged into a power supply. A low power condition does not exist when a supplemental power supply is provided.

If, in step 550 the graphics driver determines that power is not detected, then it proceeds to step 570. If, in step 550 the graphics driver determines that power is detected, i.e. a supplemental power supply is provided, then, in step 555 the graphics driver enables one or more high performance graphics processors, such as graphics processor 250, 350, 365, or 450 within a computing system, such as system 200, 202, 300, or 400. The graphics driver then returns to step 530.

In step 540 the graphics driver determines if a primary power level, e.g. battery supplied power, is below a low power threshold, and, if so, then in step 570 the graphics driver disables the one or more high performance graphics processors within the computing system. When the primary power level is below the low power threshold a low power condition exists. If, in step 540 the graphics driver determines the primary power level is not below the low power threshold, then a low power condition does not exist and in step 555 the graphics driver enables one or more high performance graphics processors within the computing system. The graphics driver returns to step 530 after completing step 555 or step 570. In other embodiments of the invention other low power conditions may be defined and detected by the graphics driver.

The graphics processing performance and power consumption for a computing system may be optimized to deliver the highest possible graphics performance for the lowest possible power consumption. When multiple graphics processing units are included within a computing system, particularly a portable system such as a laptop computer, palm-sized computer, tablet computer, game console, cellular telephone, hand-held device, or the like, one or more of the multiple graphics processing units may be enabled or disabled as needed to provide deliver a particular graphics processing performance or to adapt to a particular power environment.

The invention has been described above with reference to specific embodiments. Persons skilled in the art will recognize, however, that various modifications and changes may be made thereto without departing from the broader spirit and scope of the invention as set forth in the appended claims. Specifically, the methods and systems described may be used for processing data other than graphics data where the data is used by processors in a multi-processing data processing system. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A system for processing graphics data for display on a display device, comprising:
   a first graphics processing unit configured to process graphics data at a first performance level and to consume a first level of power, wherein the first graphics processing unit is coupled to a first frame buffer;
   a second graphics processing unit configured to process graphics data at a second performance level and to consume a second level of power, wherein the second level of power is greater than the first level of power, and the second graphics processing unit is coupled to a second frame buffer; and
   a driver configured to disable the second graphics processing unit from performing graphics data processing in response to a low power condition, wherein the low power condition exists when a power level of a power supply is below a predetermined level, and wherein disabling the second graphics processing unit includes configuring the system so that each of the second graphics processing unit and the second frame buffer do not receive power.

2. The system of claim 1, wherein the second performance level is greater than the first level of performance.

3. The system of claim 1, further comprising an interface directly coupling the first graphics processing unit to the second graphics processing unit.

4. The system of claim 1, further comprising a switch coupling the first graphics processing unit to the second graphics processing unit.

5. The system of claim 4, wherein the first graphics processing unit is included within the switch.

6. The system of claim 4, further comprising additional processing units wherein each of the additional processing units is coupled to the switch.

7. The system of claim 6, wherein each of the additional processing units is coupled to the first graphics processing unit by an interface.

8. The system of claim 4, wherein the switch includes a number of lanes and the number of lanes allocated to the first graphics processing unit is adjusted based on bandwidth usage.

9. The system of claim 8, wherein the number of lanes allocated to the first graphics processing unit is further adjusted to satisfy a level of graphics processing performance.

10. The system of claim 4, wherein the switch includes a number of lanes and the number of lanes allocated to the second graphics processing unit is adjusted based on bandwidth usage.

11. The system of claim 1, wherein the first graphics processing unit is configured to output image data to the display device.

12. The system of claim 11, wherein the first graphics processing unit is configured to produce a first portion of the image data and the second graphics processing unit is configured to produce a second portion of the image data.

13. The system of claim 11, wherein the second graphics processing unit is configured to produce the image data and provide the image data to the first graphics processing unit.

14. The system of claim 1, wherein the driver is configured to load balance graphics processing between the first graphics processing unit and the second graphics processing unit.

15. The system of claim 1, wherein the driver is configured to measure an amount of bandwidth used during processing and to resize a number of lanes allocated for transferring data.

16. The system of claim 1, further comprising a host processor coupled to the first graphics processing unit and the second graphics processing unit.

17. A method of processing graphics data in a multi-processor graphics processing system, comprising:

determining whether a low power condition exists, wherein the low power condition exists when a power level falls below a predetermined level;

processing the graphics data to produce processed graphics data for display on a display device using a low power graphics processor coupled to a first frame buffer and deactivating a high performance graphics processor coupled to a second frame buffer, when the low power condition exists, wherein deactivating the high performance graphics processor includes configuring the multi-processor graphics processing system so that each of the high performance graphics processor and the second frame buffer do not receive power; and processing the graphics data to produce the processed graphics data for display on the display device using the low power graphics processor and the high performance graphics processor, when the low power condition does not exist.

18. The method of claim 17, further comprising broadcasting the graphics data to the low power graphics processor and the high performance graphics processor when the low power condition does not exist.

19. The method of claim 18, wherein the step of broadcasting the graphics data to the low power graphics processor and the high performance graphics processor comprises broadcasting the graphics data from a host processor to the low power graphics processor and the high performance graphics processor.

20. The method of claim 17, further comprising dynamically modifying bandwidth allocated to the low power graphics processor based on bandwidth usage.

21. The method of claim 17, wherein the low power condition does not exist when a full screen mode is used.

22. The method of claim 17, wherein the low power condition does not exist when a full screen mode is used and a power level is above a threshold.

23. The method of claim 17, further comprising determining whether a full screen mode is being used prior to determining existence of the low power condition.

24. The method of claim 23, further comprising overriding the low power condition when a supplemental power supply is provided.

25. The method of claim 17, further comprising overriding the low power condition when a supplemental power supply is provided.

26. The method of claim 17, further comprising measuring bandwidth used during processing and resizing a number of lanes used for transferring data.

27. A method of processing graphics data in a multi-processor graphics processing system for display on a display device, comprising:

determining whether a battery power level is below a predetermined level;

processing the graphics data to produce processed graphics data for display on the display device using a low power graphics processor coupled to a first frame buffer and deactivating a high performance graphics processor coupled to a second frame buffer, when the battery power level is below the predetermined level, wherein deactivating the high performance graphics processor includes configuring the multi-processor graphics processing system so that each of the high performance graphics processor and the second frame buffer do not receive power; and processing the graphics data to produce the processed graphics data for display on the display device using the low power graphics processor and the high performance graphics processor, when the battery power level is at or above the predetermined level.

* * * * *